(12) United States Patent
Ogasawara et al.

(10) Patent No.: US 12,025,149 B2
(45) Date of Patent: Jul. 2, 2024

(54) DUCTED FAN

(71) Applicant: Nidec Corporation, Kyoto (JP)

(72) Inventors: Daisuke Ogasawara, Kyoto (JP); Yusuke Makino, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 218 days.

(21) Appl. No.: 17/634,256

(22) PCT Filed: Aug. 19, 2020

(86) PCT No.: PCT/JP2020/031234
§ 371 (c)(1),
(2) Date: Feb. 10, 2022

(87) PCT Pub. No.: WO2021/033707
PCT Pub. Date: Feb. 25, 2021

(65) Prior Publication Data
US 2022/0299042 A1     Sep. 22, 2022

(30) Foreign Application Priority Data

Aug. 21, 2019 (JP) .................................. 2019-150849

(51) Int. Cl.
*F04D 25/06* (2006.01)
*F04D 19/00* (2006.01)
(Continued)

(52) U.S. Cl.
CPC ......... *F04D 29/403* (2013.01); *F04D 19/002* (2013.01); *F04D 25/0613* (2013.01); *F04D 29/326* (2013.01); *F04D 29/5806* (2013.01)

(58) Field of Classification Search
CPC .................. F04D 25/08; F04D 3/00–02; F04D 19/00–024; F04D 29/186; F04D 29/326
See application file for complete search history.

(56) References Cited

U.S. PATENT DOCUMENTS 5,075,606 A * 12/1991 Lipman ................. F04D 25/066
  310/63
5,306,183 A *  4/1994 Holt ....................... H02K 21/14
  440/6

(Continued)

FOREIGN PATENT DOCUMENTS

CN     1574559 A     2/2005
CN   103872849 A     6/2014
(Continued)

OTHER PUBLICATIONS

Official Communication issued in corresponding Chinese Patent Application No. 202080058186.X, dated Sep. 23, 2023.
(Continued)

*Primary Examiner* — Thomas Fink
(74) *Attorney, Agent, or Firm* — Keating & Bennett, LLP

(57) ABSTRACT

A ducted fan that includes a housing with a cylindrical shape, a ring motor in the housing, and fan blades extending radially inward from an inner circumferential surface of the ring motor. The housing includes a first housing that covers a first side in an axial direction of the ring motor and a second housing that covers a second side in the axial direction of the ring motor. The second housing includes through holes penetrating the second housing at a portion on the second side in the axial direction with respect to the ring motor. The housing includes an outer circumferential wall including first and second wall portions located in outer circumferential portions of the first and second housings. The outer circumferential wall includes opening portions defined by a gap between the first and second wall portions.

8 Claims, 3 Drawing Sheets

(51) Int. Cl.
*F04D 29/32* (2006.01)
*F04D 29/40* (2006.01)
*F04D 29/58* (2006.01)

(56) References Cited

U.S. PATENT DOCUMENTS

| | | | | |
|---|---|---|---|---|
| 8,299,669 | B2* | 10/2012 | Gieras | B63H 23/24 |
| | | | | 310/87 |
| 2004/0253112 | A1 | 12/2004 | Bird | |
| 2010/0231066 | A1* | 9/2010 | Korner | H02K 1/32 |
| | | | | 310/61 |
| 2014/0131901 | A1* | 5/2014 | Yen | F24F 6/12 |
| | | | | 261/78.1 |
| 2017/0104385 | A1 | 4/2017 | Salamon et al. | |
| 2017/0159663 | A1* | 6/2017 | Jang | F04D 29/326 |
| 2020/0232475 | A1* | 7/2020 | Azzouz | F04D 25/066 |
| 2021/0107664 | A1* | 4/2021 | Rabbi | B64C 11/001 |
| 2022/0009644 | A1* | 1/2022 | Rabbi | B64D 29/00 |
| 2022/0297827 | A1* | 9/2022 | Colaciti | B64D 27/24 |
| 2023/0131408 | A1* | 4/2023 | Magnusson | F16C 19/06 |
| | | | | 416/179 |

FOREIGN PATENT DOCUMENTS

| | | | |
|---|---|---|---|
| EP | 2 741 403 A2 | 6/2014 | |
| JP | 51-7709 U | 1/1976 | |
| JP | 2014-117060 A | 6/2014 | |
| JP | 2017-109726 A | 6/2017 | |
| WO | WO-2015193843 A1 * | 12/2015 | ......... B60H 1/00464 |

OTHER PUBLICATIONS

Official Communication issued in International Patent Application No. PCT/JP2020/031234, dated Sep. 24, 2020.

* cited by examiner

DUCTED FAN

CROSS-REFERENCE TO RELATED APPLICATIONS

This is a U.S. national stage of application No. PCT/JP2020/031234, filed on Aug. 19, 2020, and priority under 35 U.S.C. § 119(a) and 35 U.S.C. § 365(b) is claimed from Japanese Patent Application No. 2019-150849, filed on Aug. 21, 2019, the entire disclosures of which are hereby incorporated herein by reference.

1. FIELD OF THE INVENTION

The present disclosure relates to a ducted fan.

2. BACKGROUND

A conventional ducted fan including a propeller driven by a ring motor has been known, for example.

The ring motor is accommodated in an annular casing constituting a duct. In the high output ducted fan, there is a problem that the ring motor needs to be cooled because of an increase of the heat generation amount of the ring motor.

SUMMARY

According to an example embodiment of the present disclosure, a ducted fan includes a housing with a cylindrical or substantially cylindrical shape, a ring motor in the housing, and fan blades extending radially inward from an inner circumferential surface of the ring motor. The housing includes a first housing that covers a first side in an axial direction of the ring motor and a second housing that covers a second side in the axial direction of the ring motor. The second housing includes a through hole penetrating the second housing at a portion on the second side in the axial direction with respect to the ring motor. The housing includes an outer circumferential wall including a first wall portion located in an outer circumferential portion of the first housing and a second wall portion located in an outer circumferential portion of the second housing. The outer circumferential wall includes an opening portion defined by a gap between the first wall portion and the second wall portion.

The above and other elements, features, steps, characteristics and advantages of the present disclosure will become more apparent from the following detailed description of the example embodiments with reference to the attached drawings.

DETAILED DESCRIPTION

A Z-axis direction illustrated in each drawing referred to hereinafter is a vertical direction with a positive side defined as "upper side" and a negative side defined as "lower side". A central axis J appropriately illustrated in each drawing is a virtual line that is parallel to the Z-axis direction and extends in the vertical direction. In the following description, an axial direction of the central axis J, that is, a direction parallel to the vertical direction, is simply referred to as "axial direction", a radial direction around the central axis J is simply referred to as "radial direction", and a circumferential direction around the central axis J is simply referred to as "circumferential direction".

In the following example embodiments, the upper side corresponds to one side in the axial direction, and the lower side corresponds to the other side in the axial direction. The vertical direction, the upper side, and the lower side are names for simply describing an arrangement relationship of each part and the like, and an actual arrangement relationship and the like may be also an arrangement relationship and the like other than the arrangement relationship and the like indicated by these names.

Figure 1:
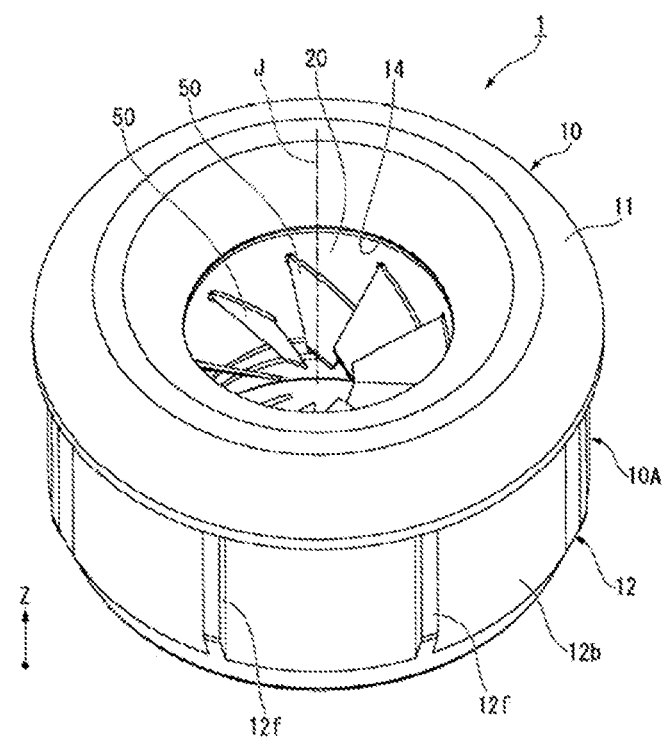
FIG. 1 is a perspective view of a ducted fan according to an example embodiment of the present disclosure as viewed from an upper side.
Figure 2:
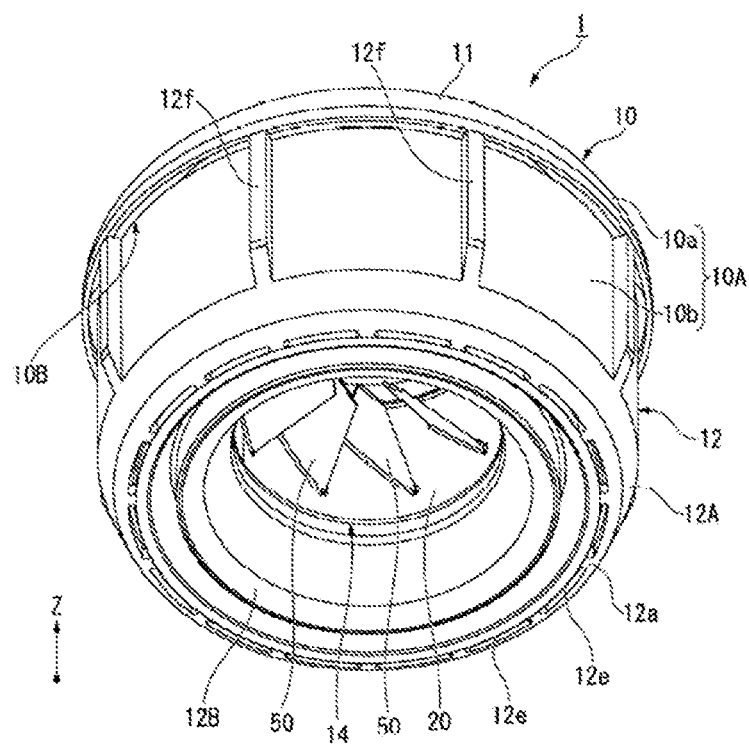
FIG. 2 is a perspective view of the ducted fan according to the example embodiment as viewed from a lower side.
Figure 3:
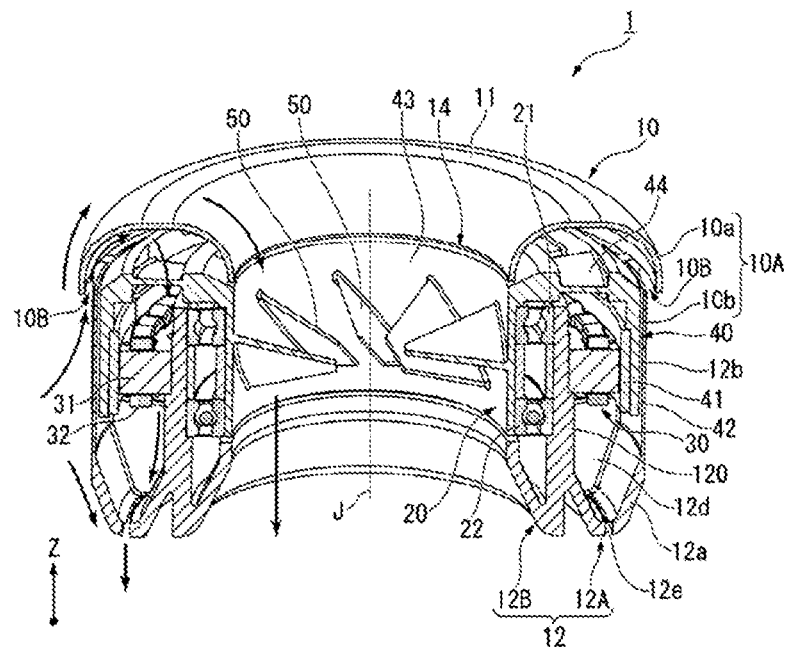
FIG. 3 is a cross sectional view of a ducted fan according to an example embodiment of the present disclosure.

As illustrated in FIGS. 1 to 3, a ducted fan 1 according to the present example embodiment includes a housing 10 with a cylindrical shape, a ring motor 20 accommodated in the housing 10, and a plurality of fan blades 50 extending radially inward from an inner circumferential surface of the ring motor 20.

The housing 10 has a first housing 11 that covers one side in an axial direction of the ring motor 20 and a second housing 12 that covers the other side in the axial direction of the ring motor 20. The housing 10 is formed in an annular shape when viewed in the axial direction. The housing 10 has an annular opening portion 14 through which the ring motor 20 is exposed on an inner circumferential side thereof.

The first housing 11 is located at an upper portion of the housing 10. The first housing 11 is formed in an annular shape when viewed in the axial direction. The first housing 11 is a semi-cylindrical member that opens downward.

The second housing 12 is located at a lower portion and an outer circumferential portion of the housing 10. The second housing 12 includes a support tube portion 120 that supports the ring motor 20, an outer circumferential housing 12A located radially outside the support tube portion 120, and an inner circumferential housing 12B located radially inside the support tube portion 120. The outer circumferential housing 12A has an annular portion 12a that extends radially outward from a lower end of the support tube portion 120 and is located in a lower side with respect to the ring motor 20, and a cylindrical portion 12b that extends to an upper side from an outer circumferential end of the annular portion 12a. The inner circumferential housing 12B is located radially inside the annular portion 12a. The inner circumferential housing 12B is formed in an annular shape when viewed from the axial direction.

The ring motor 20 is supported by the support tube portion 120 of the second housing 12. The support tube portion 120 is formed in a cylindrical shape around the central axis J and extends in a vertical direction. The ring motor 20 includes a stator 30 having an annular shape and supported on an outer circumferential surface of the support tube portion 120. The ring motor 20 further includes a rotor 40 having an annular shape and supported on an inner circumferential side of the support tube portion 120 via an upper side bearing 21 and a lower side bearing 22.

Figure 4:
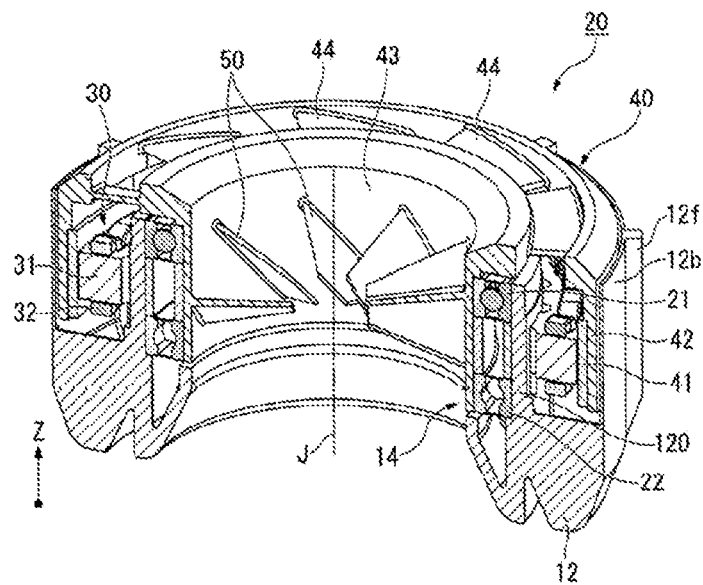
FIG. 4 is a cross sectional view of a ring motor according to an example embodiment of the present disclosure.
Figure 5:
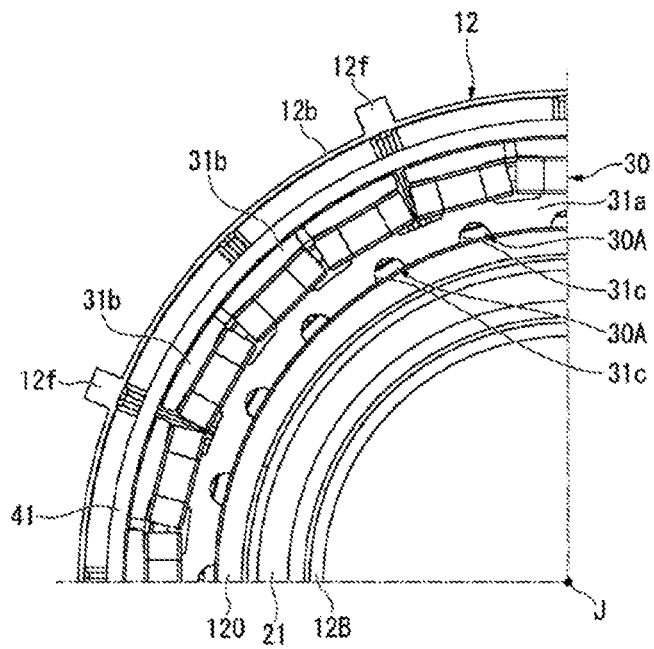
FIG. 5 is a partial plan view of a stator according to an example embodiment of the present disclosure.

As illustrated in FIGS. 3 to 5, the stator 30 includes a stator core 31 fixed to the outer circumferential surface of the support tube portion 120 and a plurality of coils 32 attached to the stator core 31. The plurality of coils 32 are arranged along a circumferential direction. As illustrated in FIG. 5, the stator core 31 includes a core back 31a that is formed in an annular shape and extends in the circumferential direction. The stator core 31 further includes a plurality of teeth 31b extending radially outward from an outer circumferential end of the core back 31a.

The stator core 31 has recesses 31c each of which is recessed radially outward from an inner circumferential surface of the core back 31a on an inner circumferential portion of the core back 31a. The stator core 31 has the plurality of recesses 31c. Each recess 31c is located radially inside the teeth 31b. Each recess 31c constitutes a fluid flow path 30A that penetrates the stator core 31 in the axial direction with the outer circumferential surface of the support tube portion 120. That is, the stator 30 includes the fluid flow paths 30A. According to the above structure, since air flows through each of the fluid flow paths 30A, heat transferred from the coils 32 to the core back 31a through the teeth 31b is efficiently diffused to the air flowing through the fluid flow paths 30A.

According to the present example embodiment, each of the recesses 31c is formed in a semicircular shape when viewed from the axial direction. The shape of each of the recesses 31c is not limited to the semicircular shape, and may be a polygonal shape such as a triangular shape or a quadrilateral shape or a curved shape such as a semi-elliptical shape when viewed from the axial direction. The shape of each of the recesses 31c is preferably a tapered shape toward the radial outside when viewed from the axial direction. With such shapes, lines of magnetic force extending between the teeth 31b via the core back 31a are less likely to be obstructed. Each of the fluid flow paths 30A may be constituted with a through hole penetrating the stator core 31 in the axial direction. Each of the fluid flow paths 30A may be a flow path through which a liquid or gas refrigerant other than air flows.

The rotor 40 includes a rotor magnet 41 radially opposed to the stator core 31, an outer cylindrical wall 42 positioned radially outside the stator core 31 and holding the rotor magnet 41, an inner cylindrical wall 43 positioned radially inside the stator core 31, and a plurality of connecting portions 44 positioned in the upper side with respect to the stator core 31 (one side in the axial direction) and connecting the outer cylindrical wall 42 and the inner cylindrical wall 43 in a radial direction.

The rotor magnet 41 is formed in an annular shape surrounding the stator core 31. The rotor magnet 41 may be a single permanent magnet or may be configured to contain a plurality of permanent magnets arranged in the circumferential direction. The rotor magnet 41 is fixed to an inner circumferential surface of the outer cylindrical wall 42 by, for example, adhesion. The method of fixing the rotor magnet 41 may be a method of using a fixing member such as a fixing frame.

The inner cylindrical wall 43 is rotatably supported by the support tube portion 120 via the upper side bearing 21 and the lower side bearing 22. The inner cylindrical wall 43 is located in the opening portion 14 that opens between an inner circumferential end of the first housing 11 and an inner circumferential end of the second housing 12. The inner cylindrical wall 43 is exposed to the inner circumferential side of the housing 10. The plurality of fan blades 50 are connected to an inner circumferential surface of the inner cylindrical wall 43.

The plurality of fan blades 50 extend radially inward from the inner circumferential surface of the inner cylindrical wall 43. Each of the plurality of fan blades 50 has an airfoil shape inclined with respect to the axial direction. The plurality of fan blades 50 are arranged at equal intervals along the circumferential direction. In the present example embodiment, although the fan blades 50 are not connected to each other, the plurality of fan blades may be connected to each other at a central position of the ring motor 20.

The connecting portions 44 are positioned in the upper side with respect to the stator 30. Each of the connecting portions 44 radially connects an upper end portion of the outer cylindrical wall 42 and an upper end portion of the inner cylindrical wall 43. The rotor 40 has the plurality of connecting portions 44. The plurality of connecting portions 44 are arranged at equal intervals in the circumferential direction. The plurality of connecting portions 44 are arranged apart from each other in the circumferential direction. Each of the plurality of connecting portions 44 has an airfoil shape inclined with respect to the axial direction. According to the above structure, as the rotor 40 rotates, a downward or upward wind is generated by the airfoil-shaped connecting portions 44. As a result, air flows through the stator 30 in the axial direction, so that the stator 30 is cooled.

The housing 10 sandwiches the ring motor 20 from above and below with the first housing 11 and the second housing 12, and accommodates the ring motor 20 therein.

The first housing 11 is located in the upper side with respect to the rotor 40. The first housing 11 is arranged so as to turn an opening portion toward the rotor 40 side. An axial position of a lower end of the first housing 11 substantially coincides with an axial position of an upper end portion of the rotor 40. An internal space of the first housing 11 is located above the connecting portions 44 of the rotor 40. A lower end surface on an inner circumferential side of the first housing 11 is opposed to an upper surface of the inner cylindrical wall 43 of the rotor 40 in the axial direction.

The outer circumferential housing 12A of the second housing 12 accommodates the outer cylindrical wall 42 of the rotor 40 and the stator 30 therein. A radially outward surface of the outer cylindrical wall 42 and the cylindrical portion 12b of the outer circumferential housing 12A are opposed to each other in the radial direction. According to the present example embodiment, an axial position of an upper end of the cylindrical portion 12b substantially coincides with an axial position of the upper end portion of the outer cylindrical wall 42.

The second housing 12 has a plurality of partition walls 12d arranged in the circumferential direction in a lower side portion in the outer circumferential housing 12A. The plurality of partition walls 12d are arranged at equal intervals in the circumferential direction. Each of the partition walls 12d is formed in a plate shape expanded in the radial direction. A lower end of each of the plurality of partition walls 12d reaches a bottom surface of the outer circumferential housing 12A. The plurality of partition walls 12d partition an internal space located in the lower side with respect to the ring motor 20 in an internal space of the outer circumferential housing 12A into a plurality of regions in the circumferential direction.

According to the above structure, the partition walls 12d suppress a flow of air in the circumferential direction from being formed in the lower region in the outer circumferential housing 12A. As a result, the air heated by passing through the stator 30 is suppressed from staying in the housing 10, so that cooling efficiency is improved.

The second housing 12 has through holes 12e each axially penetrating the outer circumferential housing 12A at a lower end of the outer circumferential housing 12A. That is, the second housing 12 has the through holes 12e each penetrating the second housing 12 at a portion on the other side (lower side) in the axial direction with respect to the ring motor 20. Each of the through holes 12e is an exhaust port in the housing 10. The air passing through the stator 30 and flowing to the lower side is discharged to the lower side of the housing 10 through the through holes 12e.

The inner circumferential housing 12B is a tapered tube portion extending to the upper side from the lower end of the support tube portion 120 toward the radially inner side. An upper end surface of the inner circumferential housing 12B is opposed to a lower end surface of the inner cylindrical wall 43 of the rotor 40 in the axial direction. The inner circumferential housing 12B constitutes an exhaust port of the ducted fan 1.

The housing 10 includes an outer circumferential wall 10A having an outer circumferential surface facing radially outward. As illustrated in FIG. 3, the outer circumferential wall 10A has a first wall portion 10a located in an outer circumferential portion of the first housing 11 and a second wall portion 10b located in an outer circumferential portion of the second housing 12. The first wall portion 10a is composed of a portion of the first housing 11 having an outer surface facing radially outward. The second wall portion 10b is composed of a portion of the annular portion 12a having a surface facing radially outward and the cylindrical portion 12b.

As illustrated in FIGS. 1 and 2, the second housing 12 has a plurality of ribs 12f protruding radially outward from an outer circumferential surface of the cylindrical portion 12b. Each of the plurality of ribs 12f extends along the axial direction. An upper end of each of the ribs 12f is fixed to the lower end on an outer circumferential side of the first housing 11. That is, each of the ribs 12f is a connector that connects the first housing 11 and the second housing 12.

Since each of the ribs 12f protrudes radially outward from the cylindrical portion 12b, the outer circumferential end of the first housing 11 connected to the upper end of each of the ribs 12f is located radially outside the outer circumferential surface of the cylindrical portion 12b. With the above structure, the outer circumferential wall 10A of the housing 10 has opening portions 10B each formed of a gap between the first wall portion 10a and the second wall portion 10b.

According to the present example embodiment, the first wall portion 10a and the second wall portion 10b are radially opposed to each other in each of the opening portions 10B, and the first wall portion 10a is located radially outside the second wall portion 10b. With the above structure, each of the opening portions 10B opens downward at an upper portion of the outer circumferential wall 10A.

According to the present example embodiment, the first housing 11 covers an end portion on the one side in the axial direction of the second housing 12 from the one side in the axial direction and the radial outside. According to the above structure, since each of the opening portions 10B is covered with the first housing 11 when viewed from the upper side, water and an object flying from the upper side are suppressed from entering an inside of the housing 10 through the opening portions 10B.

In the ducted fan 1, when the ring motor 20 is operated to rotate the fan blades 50, as illustrated in FIG. 3, a wind directed from the upper side to the lower side is generated in an inner circumference of the ducted fan 1. During the above air blowing operation, around the ducted fan 1, a flow of air toward an opening portion of the upper side that is an intake port of the ducted fan 1 and a flow of air toward the lower side that is an air blowing direction of the ducted fan 1 are formed. That is, the air flows from the lower side to the upper side in an upper side portion of the outer circumferential wall 10A, and the air flows from the upper side to the lower side in a lower side portion of the outer circumferential wall 10A.

According to the ducted fan 1 of the present example embodiment, the opening portions 10B each of which opens to the lower side are arranged on the outer circumferential wall 10A. With the above structure, the air flowing from the lower side to the upper side in the vicinity of the outer circumferential wall 10A as the ducted fan 1 operates efficiently flows into the housing 10 through the opening portions 10B.

Further, according to the ducted fan 1, the first housing 11 covers the end portion on the one side in the axial direction of the second housing 12 from the one side in the axial direction and the radial outside. With the above structure, the air flowing into the housing 10 from the opening portions 10B flows along an inner circumferential surface of the first housing 11. That is, the air flowing in from the opening portions 10B flows to the upper side and the radial inside along an outer circumferential side portion of the inner circumferential surface of the first housing 11, and after passing through a top portion of the inner circumferential surface of the first housing 11, flows to the lower side along the inner circumferential surface located radially inside the first housing 11.

According to the present example embodiment, since the rotor 40 has the airfoil-shaped connecting portions 44, the wind directed from the upper side to the lower side is generated by the connecting portions 44 as the ring motor 20 is operated to rotate. As a result, the air in the first housing 11 is sent to the lower side through gaps between the plurality of connecting portions 44, so that the air is blown to the stator 30 from the upper side. In the case of the present example embodiment, since the airfoil-shaped connecting portions 44 reduce a pressure in the first housing 11 side by the air blowing, the connecting portions 44 promote an air inflow from the opening portions 10B and contribute to improvement of cooling performance.

Figure 6:
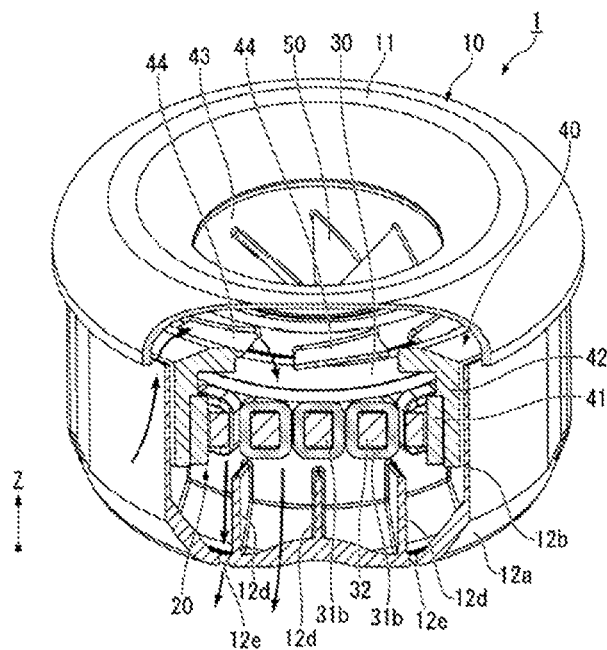
FIG. 6 is a partial cross sectional view of a ducted fan according to an example embodiment of the present disclosure.

The air blown to the stator 30 flows from the upper side to the lower side through gaps each of which is located between the adjacent coils 32 and through the fluid flow paths 30A of the stator core 31. As a result, the coils 32 and the stator core 31 are cooled by the air flowing in the axial direction. As illustrated in FIG. 6, the air that has passed to the lower side of the stator 30 goes between the partition walls 12d adjacent in the circumferential direction, flows through the through holes 12e at the lower end of the second housing 12, and is discharged to the lower side of the housing 10.

According to the ducted fan 1 of the present example embodiment including the above structure, since the opening portions 10B and the through holes 12e of the housing 10 are arranged above and below the ring motor 20 respectively, the cooling air is flowed from the opening portions 10B to the through holes 12e via the ring motor 20. Therefore, according to the ducted fan 1, the ring motor 20 in the housing 10 is efficiently cooled.

In the ducted fan 1, since each of the opening portions 10B is the gap between the first wall portion 10a and the second wall portion 10b, the opening portion 10B is easily arranged only by disposing the first housing 11 and the second housing 12 at intervals. Therefore, according to the present example embodiment, the shape of the first housing 11 or the second housing 12 does not become complicated, so that excellent manufacturability is obtained.

In the present example embodiment, the first wall portion 10a and the second wall portion 10b are connected via the ribs 12f each of which is the connector arranged along the circumferential direction. According to the above structure, the first housing 11 is stably supported by the plurality of ribs 12f each having a simple structure. Since the plurality of ribs 12f are arranged at intervals in the circumferential direction, the opening portions 10B each serving as an intake port are easily disposed between the first housing 11 and the second housing 12. Furthermore, since each of the ribs 12f extends along the axial direction, the air is easily guided in the axial direction on the outer circumferential surface of the housing 10, so that the air is easily flown into the opening portions 10B.

The present disclosure is not limited to the above described example embodiment, and may also adopt the following structures.

Although the above example embodiment has a structure that each of the opening portions 10B opens to the lower side, the present disclosure is not limited to the structure. For example, in a case where the opening portions 10B are positioned in the lower side portion of the outer circumferential wall 10A, the air is more easily taken into the housing 10 when the opening portions 10B open to the upper side. In addition, an opening direction of each of the opening portions 10B may be set to a direction in which the air is easily taken in according to the air blowing direction of the ducted fan 1. When the opening portions 10B open to the upper side, the first wall portion 10a is located radially inside the second wall portion 10b.

Furthermore, the opening portions 10B may open to the radial outside. In the above case, the first wall portion 10a and the second wall portion 10b do not overlap each other when viewed from the radial direction, and are arranged apart from each other in the axial direction.

In the above example embodiment, although each of the connecting portions 44 has the airfoil shape, each of the connecting portions 44 may have a rod shape or a plate shape without the airfoil shape. Also in the above structure, since the air flowing in from the opening portions 10B opening to the lower side is guided downward by the inner circumferential surface of the first housing 11, the flow of the air from the upper side to the lower side is formed in the outer circumferential housing 12A. Thereby, the stator 30 is cooled efficiently.

Incidentally, each structure described in the present specification may be appropriately combined within a range having no mutual contradiction.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A ducted fan comprising:
a housing with a cylindrical shape;
a ring motor in the housing; and
fan blades extending radially inward from an inner circumferential surface of the ring motor; wherein
the housing includes a first housing that covers a first side in an axial direction of the ring motor and a second housing that covers a second side in the axial direction of the ring motor;
the second housing includes a through hole penetrating the second housing at a portion on the second side in the axial direction with respect to the ring motor;
the housing includes an outer circumferential wall including a first wall portion located in an outer circumferential portion of the first housing and a second wall portion located in an outer circumferential portion of the second housing;
the outer circumferential wall includes an opening portion defined by a gap between the first wall portion and the second wall portion;
the ring motor includes a rotor with an annular shape and a stator with an annular shape;
the stator includes coils along a circumferential direction and a stator core to which the coils are fitted;
the rotor includes a rotor magnet radially opposed to the stator core, an outer cylindrical wall positioned radially outside the stator core and holding the rotor magnet, an inner cylindrical wall positioned radially inside the stator core, and connecting portions positioned on the one side in the axial direction of the stator core and connecting the outer cylindrical wall and the inner cylindrical wall in a radial direction; and
each of the connecting portions has an airfoil shape inclined with respect to the axial direction.

2. The ducted fan according to claim 1, wherein the first wall portion and the second wall portion are radially opposed to each other in the opening portion.

3. The ducted fan according to claim 2, wherein the first wall portion is located radially outside the second wall portion.

4. The ducted fan according to claim 3, wherein the first housing covers an end portion on the first side in the axial direction of the second housing from the first side in the axial direction and the radial outside.

5. The ducted fan according to claim 1, wherein the second housing includes partition walls that partition an internal space of the second housing located in the second side in the axial direction with respect to the ring motor in a circumferential direction.

6. The ducted fan according to claim 1, wherein
the ring motor includes a stator with an annular or substantially annular shape; and
the stator includes a stator core and a fluid flow path penetrating the stator core in the axial direction.

7. The ducted fan according to claim 1, wherein
the first wall portion and the second wall portion are connected via connectors along a circumferential direction in the outer circumferential wall of the housing.

8. The ducted fan according to claim 7, wherein
each of the connectors includes a rib protruding radially outward from an outer circumferential surface of the second wall portion and extending along the axial direction.

* * * * *